United States Patent [19]
Bantz et al.

[11] Patent Number: 5,507,035
[45] Date of Patent: Apr. 9, 1996

[54] DIVERSITY TRANSMISSION STRATEGY IN MOBILE/INDOOR CELLULA RADIO COMMUNICATIONS

[75] Inventors: David F. Bantz, Chappaqua, N.Y.; Frederic J. Bauchot, LaTourraque Saint-Jeannet, France; Chia-Chi Huang, Hsinchu, Taiwan; Nicholas J. A. Moulton, Sawston, England

[73] Assignee: International Business Machines Corporation, Armonk, N.Y.

[21] Appl. No.: 56,163

[22] Filed: Apr. 30, 1993

[51] Int. Cl.$^6$ .................................................. H04B 1/02
[52] U.S. Cl. ...................... 455/133; 455/101; 455/277.2; 375/299; 375/347
[58] Field of Search ................................. 455/52.3, 52.1, 455/65, 101, 133, 134, 136, 140, 275, 277.1, 277.2, 33.1, 33.3; 375/40, 100, 347, 299

[56] References Cited

U.S. PATENT DOCUMENTS

| | | | |
|---|---|---|---|
| 4,253,193 | 2/1981 | Kennard et al. | 455/101 |
| 4,513,412 | 4/1985 | Cox | 455/101 |
| 4,761,822 | 8/1988 | Maile | 455/82 |
| 4,953,197 | 8/1990 | Kaewell et al. | 379/58 |
| 5,065,449 | 11/1991 | Gordon et al. | 455/15 |
| 5,097,484 | 3/1992 | Akaiwa | 375/40 |
| 5,123,029 | 6/1992 | Bantz et al. | 375/1 |
| 5,203,010 | 4/1993 | Felix et al. | 455/56.1 |
| 5,373,548 | 12/1994 | McCarthy | 455/67.1 |

*Primary Examiner*—Reinhard J. Eisenzopf
*Assistant Examiner*—Doris To
*Attorney, Agent, or Firm*—Jack M. Arnold; Louis J. Percello

[57] ABSTRACT

In a mobile cellular communication system, a base station is wired to a Local Area Network (LAN), and has wireless communication with a plurality of mobile stations. Multipath fading is substantially reduced in the system by utilizing antenna diversity techniques at the base station and each of the plurality of mobile stations. The combination of the independent operation of antenna selection diversity at both a base station and a mobile station results in the selection of the best propagation path between the two stations.

11 Claims, 4 Drawing Sheets

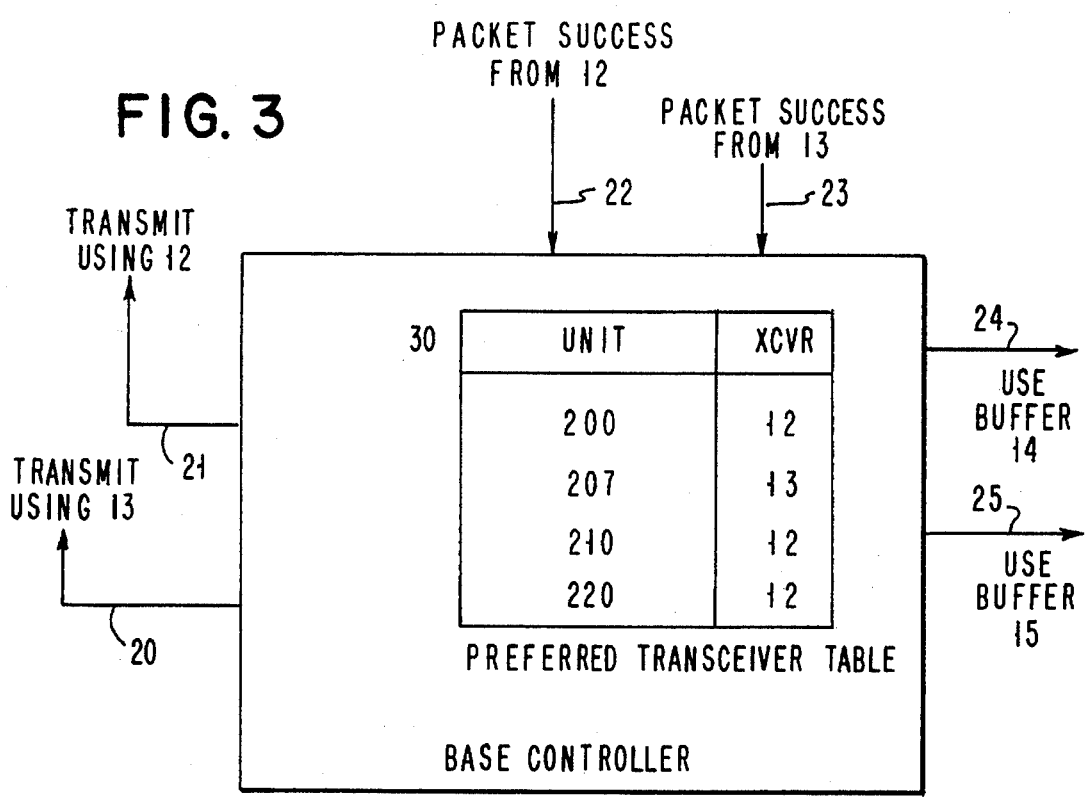
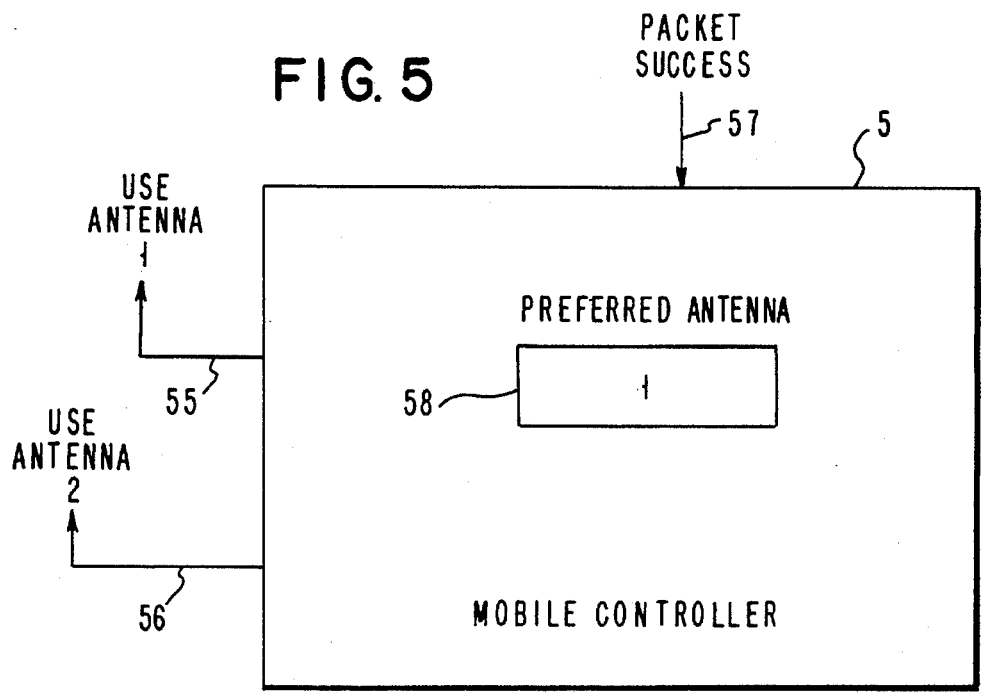

DIVERSITY TRANSMISSION STRATEGY IN MOBILE/INDOOR CELLULA RADIO COMMUNICATIONS

FIELD OF THE INVENTION

This invention relates generally to data communications via radio, and in particular to the problem of multipath fading. Specifically, a combination of antenna diversity techniques is utilized at both a base station and a mobile station in a dynamic way to mitigate the effects of multipath fading in the data transmission process.

BACKGROUND OF THE INVENTION

In a mobile/indoor cellular radio communication system, a base station usually communicates with multiple mobile stations and functions as a bridge between mobiles and landline networks such as Local Area Networks (LANs). One of the major impairments in this radio communication environment is the multipath fading phenomenon. Antenna diversity techniques have been used to mitigate this multipath fading phenomenon. However, either transmitting or receiving antenna diversity techniques have been utilized in the past. These techniques have been utilized in a number of patents, each having certain advantages and disadvantages.

U.S. Pat. No. 4,761,822 to Maile discloses a burst-mode two-way communication system in which a plurality of transceivers at a base station share a common antenna arrangement. The common antenna arrangement consists of a plurality of antenna branches and antenna branch selection is made by an operative base station transceiver with regard to the received signal strength from a portable transceiver.

U.S. Pat. No. 4,953,197 to Kalwell, Jr. et al discloses a spatial diversity system in which a post-detection selection diversity scheme is used. The selection criteria are link quality, AGC level, and parity check errors. The main emphasis is on radio telephone communication applications.

U.S. Pat. No. 5,065,499 to Gordon et al discloses a switching antenna diversity scheme in which each antenna is coupled with circuitry to measure the instantaneous and average received signal strength. Antennas are switched if the current signal strength of selected antenna falls below a threshold calculated from the average value. Antennas are also switched if no switching occurs during a predetermined elapsed time. After the switch, a measured signal strength value is compared with the previous value and the system switches back to the previous antenna if the previous signal strength is higher.

U.S. Pat. No. 5,123,029 to Bantz et al which is assigned to the assignee of this invention, discloses a hybrid controlled access and random access schemes using frequency hopping spread spectrum communications techniques, and which is implemented in an indoor digital data radio communication system between mobile stations and a computer system. A hop in the frequency hopping spread spectrum, communication system is subdivided into two intervals so that different media-access protocols can be used in each interval. The protocol uses a centralized control scheme in one interval and a decentralized scheme in the other, and the intervals may be varied depending on the load of the system. U.S. Pat. No. 5,123,029 is incorporated herein by reference.

According to the present invention, both transmitting and receiving antenna diversity techniques are dynamically combined and coordinated to combat the multipath fading phenomena in a wireless radio communications system. That is, the invention is directed to a strategy for combining the use of a selection antenna diversity technique at a stationary unit such as a base station, and a selection or switching antenna diversity technique at a remote station efficiently, for data packet transmission in a wireless radio communications system.

DISCLOSURE OF THE INVENTION

In a mobile/indoor cellular radio communication environment, antenna diversity techniques are used at both a stationary unit such as a base station and a mmobile station in a cooperative way. A selection antenna diversity implementation is used at a base station where multiple antenna/transceiver branches are available and post-detection selection can be performed. The selection antenna diversity implementation can be used for either nmicro-diversity or macro-diversity purposes. A "preferred antenna" selection strategy is implemented at the base station to select the transmitting antenna. The selection is based on the result of the most recent data transmission or reception. Received signal strength is measured at each antenna/transceiver branch and the information is used in the selection of the "preferred antenna". A switching antenna diversity implementation is used at a mobile station where multiple antennas are connected by a switch to a single radio transceiver. In this method, a "preferred antenna" selection strategy is implemented at the mobile to select the antenna. The selection is based on the result of the most recent data transmission. If the most recent transmission is not successful, another antenna is selected as the "preferred antenna". The preferred antenna is used for both transmission and data reception. A selection antenna diversity implementation may also be used at a mobile station where multiple antenna/transceiver branches are available and post-detection selection can be performed. A "preferred antenna" selection strategy is implemented at the mobile station to select the transmitting antenna. The selection is based on the result of the most recent data transmission or reception. Received data quality is measured at each antenna/transceiver branch and the information is used in the selection of the "preferred antenna". Also, an integration of both the time diversity concept and the antenna diversity concept at both a base and a mobile station may be utilized to select the "preferred antenna" and utilize both the reciprocal and the quasi-static properties of a mobile/indoor radio propagation channel.

BRIEF DESCRIPTION OF THE DRAWINGS

FIG. 3 is a block diagram of a stationary station controller;

FIG. 5 is a block diagram of a mobile station controller; and

DESCRIPTION OF THE PREFERRED EMBODIMENT

Figure 1:
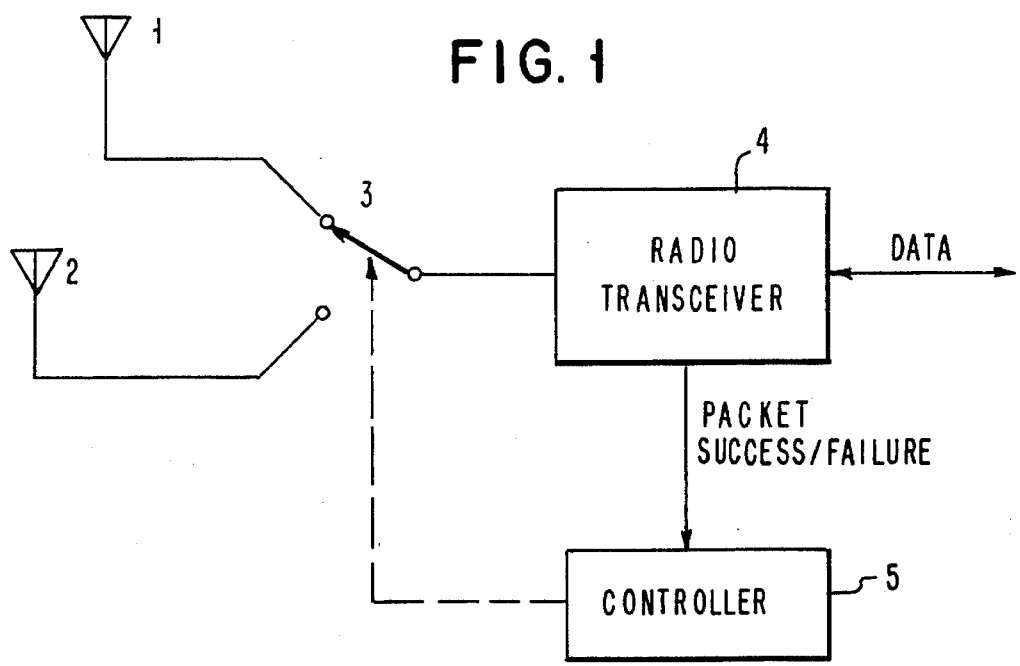
FIG. 1 is a block diagram of an antenna switching diversity system.

In the following description, the terms stationary unit and base station are used interchangeably. The invention is directed to a strategy to use both base station antenna diversity and mobile station antenna diversity in a cooperative way in a mobile cellular radio communication system. Two kinds of antenna diversity techniques are considered. The first kind of antenna diversity technique is selection antenna diversity. By "selection antenna diversity" it is meant that at a station there are several separate radio transceivers connected to separate antennas which are separated at least by a "fading coherence distance". The "selection" is performed after demodulation and packet buffering when receiving a packet. This means that a station with multiple antennas receives multiple copies of every packet and can choose the good one instead of the bad ones. In the following, it is assumed that a base station uses only selection antenna diversity. The second kind of antenna diversity is switching antenna diversity. By "switching antenna diversity" it is meant that at a station there is only one radio transceiver and the transceiver is connected to a switch which leads to separate antennas. In this case, a station receives only one copy of every packet from its selected antenna. In the following, it is assumed that a mobile station can use either switching antenna diversity or selection antenna diversity.

There are two applications of antenna diversity: microdiversity, in which the antennas are close together, and macro-diversity, in which the antennas are far apart. Micro-diversity combats multipath fading; macro-diversity has a dual role in combatting multipath fading and shadowing (the situation in which a good path does not exist due to obstruction). The antenna and radio transceiver combination at a base station can be treated as a single unit and the unit can be deployed for either micro-diversity or macro-diversity purpose. On the other hand, only a micro-diversity scheme is used at a mobile station.

The idea of using antenna diversity is that if a signal received at one antenna is affected by multipath fading or shadowing, a signal at another antenna may not be. This depends on the antennas being sufficiently separated in space or orientation. Measurements have indicated that separation by more than half a wavelength, or orthogonal orientation, is sufficient to ensure that the received signals be uncorrelated for achieving micro-diversity.

The following is a general description of the invention with respect to two described Cases, with a detailed description following.

Case I

First, a case is considered in which two-branch selection antenna diversity (two antennas and two radio transceivers) is available at a base station and two-branch switching antenna diversity (two antennas and a single radio receiver) is available at a mobile station. The case of more than two branches at either a base station or a mobile station can be easily generalized from the following discussion and is not detailed here.

In the situation where a base station has multiple diversity antennas a method must be provided for the use of diversity when the base station transmits to a mobile station. The method used is called "time diversity." A base station maintains in its memory a "preferred antenna" choice and updates that choice as follows:

1. When a mobile station transmits a data packet to the base station, the base station records which of its two antennas was the more successful in receiving the packet. Here, "more successful" means a successful reception of a data packet with higher received signal energy. If both receptions are unsuccessful, there is no change of the preferred antenna. If both are successful, the antenna with a higher received signal energy becomes the preferred antenna. If only one antenna is successful, that antenna becomes the preferred antenna.

2. When the base station transmits to the mobile station, the base station uses the preferred antenna. This choice is sensible because the radio channel is "reciprocal"—it looks the same from both ends, except in the presence of interference, when the same frequency channel is used for both reception and transmission and the delay between the two is short with regard to the rate the multipath channel changes.

3. When the mobile station acknowledges receipt of the packet from the base station successfully, the base station does nothing unless one antenna received the acknowledgement more successfully, and that antenna was not the preferred antenna. In this case, the choice of preferred antenna is changed.

4. If the acknowledgement from the mobile station is not received, the base station retries the data packet on the other antenna, which now becomes the preferred antenna. Now the base station returns to step 3 until the retry count is exhausted.

In the method described above, the preferred antenna is always chosen to be the antenna on which the most recent transmission or reception is successful. This is because the propagation characteristics of the path may be constantly changing. Any assumptions about which antenna should be the preferred antenna based on information that is more than a few milliseconds old are not likely to be relevant.

When a mobile station transmits a data packet to a base station, a "preferred antenna" is maintained and updated in the following way:

1. When the mobile station transmits to the base station, it uses its currently preferred antenna. In the beginning, it randomly chooses one antenna as the preferred antenna.

2. The mobile station listens for an acknowledgement from the base station using the preferred antenna.

3. If the mobile station receives its acknowledgement from the base station, it retains the current preferred antenna. If not, it switches to the other antenna and retries. In this case, the preferred antenna is changed.

4. Now the mobile station returns to step 2 until the retry count is exhausted.

Note that under this strategy, both the mobile station and the base station may be independently switching transmit antennas. The base station chooses its "preferred antenna" according to the result of either transmission or reception. On the other hand, the mobile station chooses its "preferred antenna" according only to the result of its transmission. The mobile station always uses its "preferred antenna" in the process of receiving a data packet from the base station.

Case II

Now, a case is considered in which two-branch selection antenna diversity (two antennas and two radio transceivers) is available at both a base station and a mobile station. The case of more than two branches at both stations can be easily generalized and is not discussed here.

In this case, the operation of the base station selection antenna diversity scheme is the same as the one discussed in case I. The operation of mobile station selection antenna diversity scheme is analogous to the operation in the base station. A mobile station uses and updates its "preferred antenna" choice in the following way:

1. When the base station transmits a data packet to a mobile station, the mobile station records which of its two antennas was the more successful in receiving the packet. Here, by "more successful" is meant a successful reception of a data packet with higher received signal energy. If both receptions are unsuccessful, there is no change of the preferred antenna. If both are successful, the antenna with higher received signal energy becomes the preferred antenna. If only one antenna is successful, that antenna becomes the preferred antenna.

2. When the mobile station transmits to the base station, the mobile station uses the preferred antenna.

3. When the base station acknowledges receipt of the packet from the mobile station successfully, the mobile station does nothing unless one antenna received the acknowledgement more successfully than the other antenna, and that antenna was not the preferred antenna. In this case, the choice of preferred antenna is changed.

4. If the acknowledgement from the base station is not received, the mobile station retries the data packet on the other antenna, which now becomes the preferred antenna. Now the base station returns to step 3 until the retry count is exhausted.

In the detailed description that follows, it is the case that the only indication of whether a packet has been more sucessfully received is determined at the end of packet reception. The preferred means for this indication is the success or failure of the computation of an error-detecting code, or checksum. In general, this is a powerful and effective means of determining packet reception success. It is more direct than such means as measuring received signal strength, because strong received signals may be corrupted by interference or multipath distortion.

In FIG. 1 there is shown two antennae 1 and 2, an antenna switch 3, a radio transceiver 4 and a controller 5. This illustrates "switching diversity", a technique wherein signals from a plurality of antennae are switched to a single radio transceiver under the control of a controller. The transceiver 4 signals the controller 5 at the completion of each packet reception. The signal indicates whether the packet was successfully received or not. The controller switches between a plurality of antennae 1,2 by controlling the antenna switch 3. In order not to corrupt the reception of a packet, the controller may switch antennae only between packet receptions, not during the reception of a packet.

Packet transmission using switching diversity requires the selection of the transmitting antenna by the controller 5 controlling the antenna switch 3. This selection must be done before the controller initiates packet transmission and the switch setting must not be changed until the entire packet has been transmitted.

Figure 2:
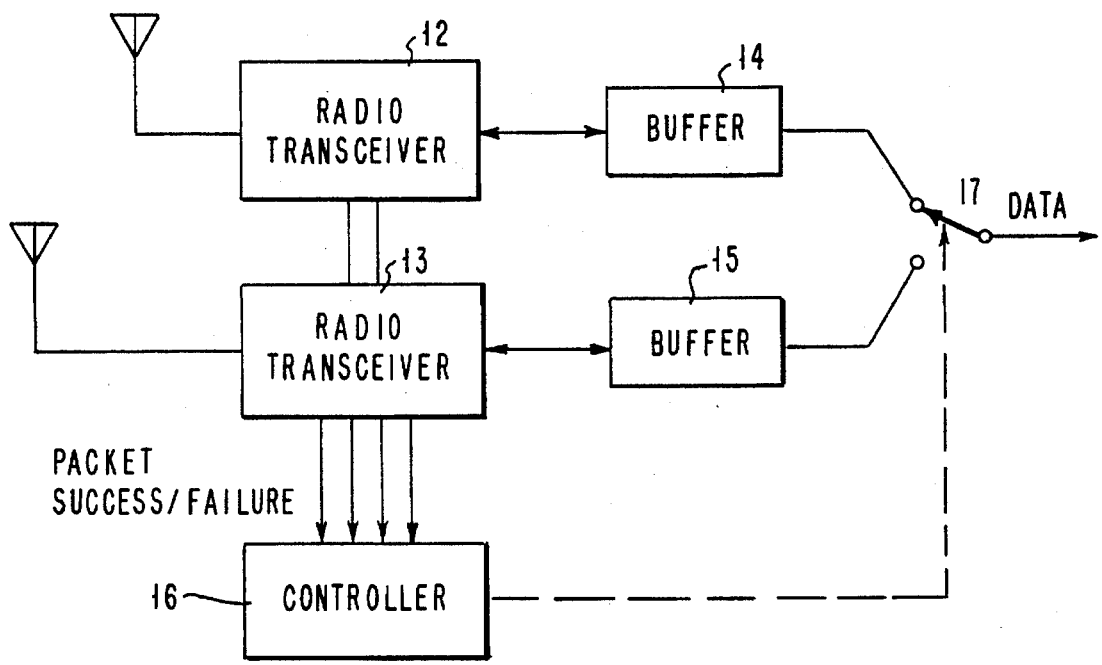
FIG. 2 is a block diagram of an antenna selection diversity system.

In FIG. 2 there is shown two antennae 10 and 11, two radio transceivers 12 and 13, two buffers 14 and 15, a selector 17, and a controller 16. This illustrates "selection diversity," a technique wherein independently received packets are checked for correctness and only the correct packet is selected by the controller for transmission to the rest of the data communications system. The received packets are buffered in their entirety in buffers 14 and 15, respectively. The transceivers 12 and 13 signal the controller 16 at the completion of each packet reception. The signal indicates which, if any, of the transceivers 12 and 13 successfully received the packet. The controller 16 switches between the buffers 14 and 15 to supply the correct packet to the data communications system.

Packet transmission using selection diversity requires the selection of which transceiver 12 or 13 is to transmit the packet before packet transmission is initiated. This selection is performed by the controller 16 using means which are described in detail later. Either or both of the transceivers may be selected. The packet to be transmitted is loaded into buffers 14 and 15 before transmission is initiated. In an alternative embodiment it may be possible for both transceivers 12 and 13 to share a single buffer for transmission.

The invention described herein consists of control means for controlling both switching and selection diversity. A given system may consist of units with all switching diversity, all selection diversity, or a combination of both. In the preferred embodiment, stationary units such as base stations which are used to bridge between wireless and wired data networks use selection diversity, while mobile units such as mobile stations use switching diversity. Again in the preferred embodiment, mobile stations transmit only to base stations, while base stations transmit to all mobile stations in their vicinity.

In FIG. 3 is shown a base station controller 16 which provides signals on lines 20 and 21 for selecting which base station transceiver 13 or 12, respectively, is to transmit to mobile stations, signals on lines 24 and 25 to select which buffers 14 or 15, respectively, should be used for transmission to the rest of the data communication system, and signals 22 and 23 from the base station, transceivers 12 and 13, respectively, indicating their respective success in receiving packets. Also shown is a preferred transceiver table 30 in the memory of base station controller 16 which records which transceiver is preferred for transmission to a particular mobile station. The table 30 shows, for example, that the preferred transceiver for transmitting to mobile station 210 is transceiver 12.

When a packet is received, the base station controller 16 receives signals on either line 22 or line 23 or both. In response to these signals the base station controller 16 activates either line 24 or 25. If both line 22 and 23 are active, the base station controller 16 may activate either line 24 or line 25. In general, it may not activate both lines.

Each time a packet is received, the base station controller 16 may update the preferred transceiver table 30 of the base station controller 16. If only one of the base station transceivers 12 or 13 was successful in receiving the packet (only one of lines 22 and 23 is active) the preferred transceiver table 30 entry is checked to see if the signal corresponds to the current preferred transceiver as recorded in the preferred transceiver table 30. If it does not, the preferred transceiver table 30 entry is updated.

Figure 4:
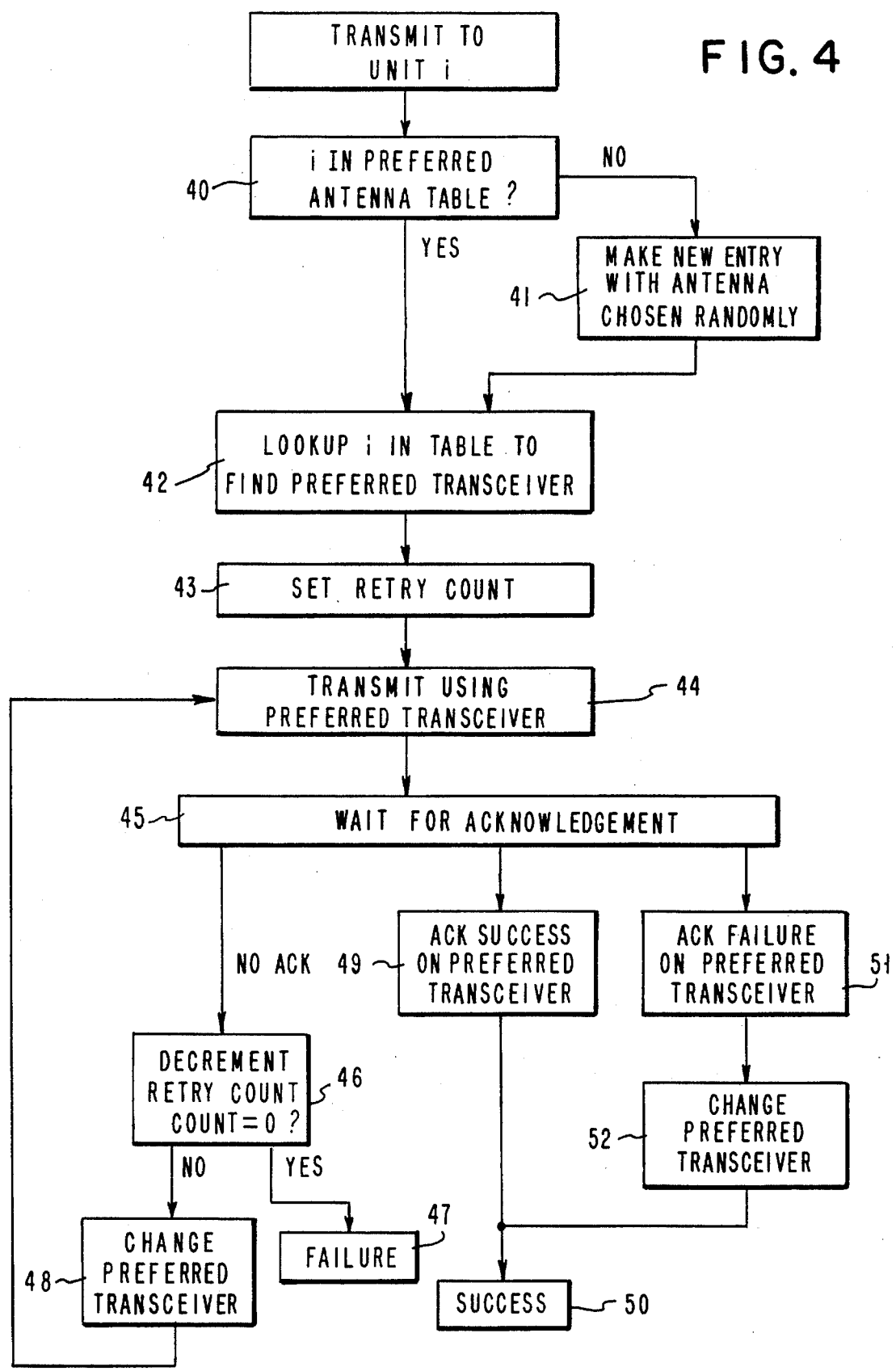
FIG. 4 is a flow chart of a stationary station controller's actions upon transmission from a base station to a mobile station.

FIG. 4 is a flow chart which shows the actions of the base station controller 16 upon transmission to a selected mobile station i. The base station controller 16 first examines the preferred base station transceiver table 30 at block 40. If mobile station i has not been transmitted to before, the base station controller 16 makes a new entry into the preferred base station table 30 at block 41 with the mobile station number i and with a randomly chosen preferred transceiver. The preferred base station transceiver is chosen randomly in order to equalize the loading on the base station transceivers. If a specific base station transceiver were always chosen as the first preferred base station transceiver, that base station transceiver would be used more frequently and might fail more often. Once an entry is found in the preferred base station transceiver table 30 that entry is accessed at block 42 to determine the preferred base station transceiver for transmission to the mobile station. A retry count is initialized to a predetermined count at block 43 so that there is a limit on transmission retries.

Transmission is then initiated to the mobile station at block 44 using the preferred base station transceiver. The preferred base station transceiver is then switched to receive mode to await an acknowledgement from the mobile station at block 45. If no acknowledgement is received within a specified time, the retry count is decremented at block 46. If the retry count is then zero, this is indicative that the controller 16 has attempted to transmit to the mobile station a predetermined number of times without success, and then returns an indication of its failure on line 47 to the rest of the data communication system. If the retry count is not then zero, the base station controller 16 changes the preferred base station transceiver entry for the selected mobile station in the preferred transceiver table 30 at block 48 and then returns to block 44 and attempts retransmission with the other transceiver.

If an acknowledgement is successfully received within a specified time as indicated at block 49, the base station controller 16 returns an indication of success on line 50 to the rest of the data communication system. The base station controller 16 then checks to see if the preferred base station transceiver was either one of, or the only one to receive the acknowledgement, as shown at block 51. If it was the only one, no further action is taken. If it was not the only one, the base station controller 16 changes the preferred base station transceiver entry in the preferred base station transceiver table 30 at block 52 for the selected mobile station before indicating success.

It is seen that the processing at a base station during reception, together with the processing shown in FIG. 4 has the effect of using the base station transceiver which was most successful in receiving data from the selected mobile station as the transceiver on which transmission will be first attempted. If no acknowledgement is received, the base station controller 16 tries either transceiver alternately.

In FIG. 5 is shown a mobile station controller 5 with signals on lines 55 and 56 which control which mobile station antenna 1 or 2, respectively, is selected for transmission and reception, and a signal on line 57 from the mobile station transceiver 4 indicating that the last packet reception was a success. Also shown is a mobile station storage means such as a register or table 58 containing the number of the currently preferred mobile station antenna. The currently preferred mobile station antenna is antenna 1.

When a packet is received the mobile station controller 5 transmits an acknowledgement using the currently preferred mobile station antenna, retained in the preferred mobile station antenna register or table 58. Since the only information available after packet reception is whether the packet was received successfully by the mobile station, that information is not sufficient to determine whether the packet was transmitted from the base station, or whether the packet was noise or interference, so the preferred mobile station antenna is not switched at this time.

Figure 6:
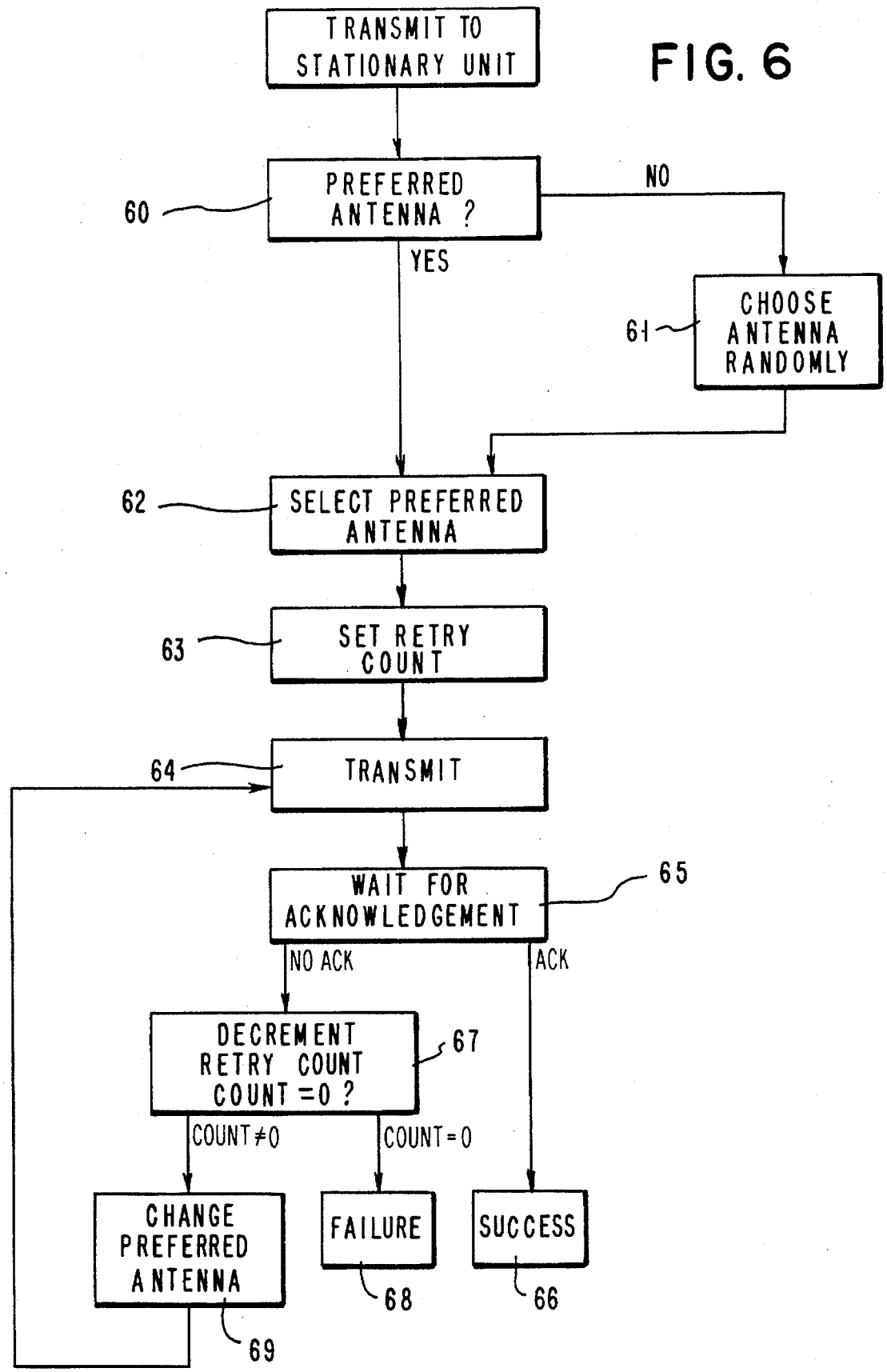
FIG. 6 is a flow chart of a mobile station controller's actions upon transmission from a mobile station to a base station.

FIG. 6 is a flow chart which shows the actions of the mobile station controller 5 for transmission of a packet to the base station. Transmission from a mobile station is always to the base station. First the preferred mobile station antenna register 58 is inspected at block 60 to determine whether there is a currently preferred mobile station antenna. If not, the mobile station antenna is chosen randomly at block 61 and its number is set into the preferred mobile station antenna register 58. In either event a preferred mobile station antenna is selected at block 62. A retry count is then initialized to a predetermined count at block 63 so there is a limit on transmission retries, and the packet is then transmitted at block 64. An acknowledgement is waited for at block 65. If an acknowledgement is received within a specified period of time, the mobile station controller 5 returns an indication of success on line 66 to the rest of the data communication system. If not, the retry count is decremented and tested against zero at block 67. If zero, the mobile station controller 5 has already tried the maximum number of times to transmit the packet, and returns an indication of failure to the rest of the data communication system on line 68. However, if the retry count is not zero, the contents of the preferred mobile station antenna register or table 58 are changed to select the other antenna at block 69, and a return is made to block 64, and transmission is attempted again.

It is seen that the processing shown in FIG. 6 has the effect of using the mobile station antenna which was most successful in receiving the acknowledgement from the base station as the mobile station antenna on which transmission will be attempted. If no acknowledgement is received from the base station, the mobile station controller will try either antenna alternately. The combination of the processing shown in FIG. 4 for the base station, together with the processing shown in FIG. 6 for the mobile station, keeps using the same antenna/transceiver pair as long as that is the most successful pair. The base station switches base station transceivers if necessary on transmission. On reception, the mobile station switches mobile station antennas if necessary.

In an extension of the preferred embodiment, it may be the case that mobile stations are structured as in FIG. 2, with selection diversity. In this case, the function of the mobile station during packet reception is similar to that described above for a base station. If one of the transceivers is successful in receiving a packet and the other is not, the success is recorded in the preferred antenna register 58 of the modified controller 5. (The controller must be modified so as to accept signals on lines 22 and 23 and to generate signals on lines 20 and 21, and lines 24 and 25.) The function of the mobile station is the same as depicted in FIG. 4, except that it is not necessary to look up the destination unit in a table. The preferred transceiver register 58 contains the number of the transceiver to be used.

In another extension of the preferred embodiment, it may be the case that base station is structured as in FIG. 1, with switching diversity. In this case, the function of the base station for reception is similar to that described above for mobile stations. The base station controller is similar to that of FIG. 5, except that instead of a single preferred antenna register 58 there must be a preferred antenna table 30. On transmission, the function of the base station is similar to that depicted in FIG. 6, except for the need to look up the preferred antenna in table 30, as in FIG. 4.

The invention is not limited to radio transceiver systems, but can also be used with other wireless data communications systems, for example infrared systems. Such systems do not suffer from multipath-induced Rayleigh fading, but if the separate infrared transceivers or pickups are located some distance from each other and the mobile stations are moving, the invention as described, chooses the best combination of transceivers in the base station and mobile stations.

In summary, a strategy has been described to coordinate the use of antenna diversity techniques at both a base station and a mobile station such that the radio system performance degradation due to multipath fading can be reduced in mobile/indoor cellular radio communications.

In the strategy, in one instance selection antenna diversity is used at a base station where multiple antenna/transceiver branches are available and post-detection branch selection is performed by the radio system controller/adapter. An antenna/transceiver branch is defined to be a "preferred" one if the most recent data transmission or reception is more successful with this particular antenna/transceiver branch. The preferred antenna is always selected for next data transmission.

On the other hand, either switching antenna diversity or selection antenna diversity can be used at a mobile station. When switching antenna diversity is used, multiple antennas are connected through a switch to a single radio transceiver at the mobile station. In this situation, an antenna is defined as "preferred" if the most recent data transmission through the antenna is successful. A preferred antenna is used for both data transmission and reception.

When selection antenna diversity is used at a mobile station, the mobile station operates in a similar way as the base station does. An antenna/transceiver branch is defined to be a "preferred" one if the most recent data transmission or reception is more successful with this particular antenna/transceiver branch. The preferred antenna is always selected for next data transmission.

By combining the independent operations of selection antenna diversity at both a base station and a mobile station, the best propagation path between the two stations is selected, assuming the multipath channel does not change faster than the speed at which the preferred antennas are dynamically chosen.

Having thus described our invention, what we claim as new and desire to secure by Letters Patent is:

1. In a diversity transmission system for wireless radio communications between a base station and at least one mobile station, the combination:

multiple antennas at said base station and said at least one mobile station for transmission of data between the respective stations;

means in the base station for determining which one of said multiple antennas received data most successfully, during a last reception by said base station with this antenna being referred to as a preferred antenna of said base station;

means in said at least one mobile station for selecting one of said multiple antennas in such mobile station as a preferred antenna for said mobile station based on its use to successfully receive data during the last reception by that mobile station;

a preferred antenna storage means in the base station and in at least one mobile station in which is stored indicia indicative of which antenna at such station is determined to be the preferred antenna;

a controller at said base station and said at least one mobile station which is responsive to said indicia stored in the preferred antenna storage means for controlling the transmission of data between the respective stations by selecting the preferred antenna at the respective stations;

means in the base station and at least one mobile station to select one of the multiple antennas of that station as the preferred antenna in absence of said stored indicia;

means in said base station for repeating a transmission until an acknowledgement of such transmission from said at least one mobile station is received or until a predetermined number of such repeated transmissions are performed; and means for changing the preferred base station antenna for each such repeated transmission.

2. The combination claimed in claim 1 including:
   means in said mobile station for signalling a failure to said at least one mobile station when said acknowledgment of reception of the data is not received after said predetermined number of transmissions of the data.

3. The diversity transmission system of claim 1 including:
   means for storing data received during said last reception from each of the multiple antennas at said base station; and means for selecting the data from the said one of said multiple antennas that received data most successfully at said base station for use after said last reception is complete.

4. The diversity transmission system of claim 1 wherein said means for determining which of said multiple antennas in said base station and said at least one mobile station received signals most successfully is a means for measuring received signal strength to make the determination.

5. The diversity transmission system of claim 1 wherein said means for determining which of said multiple antennas in said base station received signals most successfully includes error correction means to make the determination.

6. A diversity transmission system for determining the best wireless communication path between a base station and a mobile station, comprising:

at least two base station antennas for transmission of data between said base station and said mobile station;

means for determining which of said at least two base station antennas receives transmitted data most successfully from said mobile station, with this antenna being referred to as a preferred base station antenna;

a base station storage means for storing indicia indicative of which base station antenna is determined to be the preferred base station antenna;

means responsive to stored indicia in said base station storage means for selecting the preferred base station antenna for a next transmission of data from said base station to said mobile station;

means in said base station to randomly select one of the at least two antennas at the base station as the preferred antenna for said next transmission in the absence of said stored indicia;

means for repeating transmissions of data of said next transmission until an acknowledgement of data reception is received from said mobile system or until a predetermined number of such repeated transmissions are performed;

means for changing which of said at least two base station antennas is the preferred base station antenna for each such repeated transmission;

means signaling failure to said base station when an acknowledgement of reception is not received after the predetermined number of repeated transmissions are performed without success;

means for changing the preferred base station antenna for the transmission of the data if a later reception at the base station is more successfully received on other than on a then preferred base station antenna;

means for updating the indicia stored in said base station storage means to reflect the change in said preferred base station antenna at least two mobile station antennas for transmission of data between said mobile station and said base station;

means for determining if one of said at least two mobile station antennas receives transmitted data successfully from said base station, with this antenna being referred to as a preferred mobile station antenna;

a mobile station storage means in which is stored indicia indicative of which mobile station antenna is determined to be the preferred mobile station antenna;

means responsive to stored indicia in said mobile station storage means for selecting the preferred mobile station antenna for transmission of data from said mobile station to said base station;

means in said mobile station to randomly select one the at least two antennas at the mobile station as preferred the preferred mobile station or antenna for transmission in absence of said stored indicia;

means for changing the preferred mobile station antenna if an acknowledgement of reception of data isn't received from the base station;

means for updating the indicia stored in said mobile station storage means to reflect the change in said preferred mobile station antenna; and means in said mobile station for signalling a failure to said mobile station when said acknowledgement of reception of data is not received from said base station following a predetermined number of transmissions of data from said mobile station to said base station.

7. In a diversity transmission system for wireless radio communications between a base station and a plurality of mobile stations, the combination of:

at least two base station antennas at said base station for transmission of data between said base station and said plurality of mobile stations;

at least two base station radio transceivers located at said base station with each such transceiver being connected to a different one of said at least two base station antennas;

means of determining which one of said at least two base station transceivers received data most successfully during a last reception by said base station from each of said plurality mobile stations, with this transceiver being referred to as a preferred base station transceiver with respect to a mobile station it is receiving data from;

a preferred base station transceiver storage means in said base station controller, in which is stored indicia indicative of which base station transceiver is determined to be the preferred base station transceiver with respect to each of said plurality of mobile stations;

means responsive to stored indicia in said preferred base station transceiver storage means for selecting the preferred base station transceiver for transmission of data from said base station to a given mobile station of said plurality of mobile stations;

means for changing the preferred base station transceiver for said given mobile station if an acknowledgement of reception of data from said given mobile station isn't received, or if the acknowledgement is received more successfully on a base station transceiver other than said preferred transceiver;

means in said base station for signalling a failure at said base station when said acknowledgement of reception of data is not received from a given mobile station following a predetermined number of transmissions of the data from said base station to said given mobile station using different ones of said at least two base station transceivers;

means for updating the indicia stored in said preferred base station to reflect the change in preferred antenna for said given mobile station;

at least two mobile station antennas at each of said plurality of mobile stations for transmission of data between said plurality of mobile stations and said base station;

a mobile station radio transceiver located at each of said plurality of mobile stations, which is selectively connected to said at least two mobile station antennas;

means for determining which one of said at least two mobile station antennas at each of said plurality of mobile stations, received data most successfully during a last transmission from said base station, with this mobile station antenna being referred to as a preferred mobile station antenna;

a preferred mobile station antenna storage means at each of the plurality of mobile stations in which is stored indicia indicative of which mobile station antenna at that station is determined to be the preferred mobile station antenna;

means, at each of said plurality of mobile stations which is responsive to the stored indicia in said preferred mobile station antenna storage means for selectively connecting said mobile station radio transceiver to the preferred mobile station antenna for controlling the transmission of data between a mobile station and said base station; and means in the base station and at each of the plurality of mobile stations to select one of the transceivers at that station to act as the preferred transceiver in absence of stored indicia as to the transceiver that received data more successfully.

8. The combination claimed in claim 11 including:

means in said mobile station for signalling a failure at said given mobile station when an acknowledgement of reception of data is not received from said base station following a predetermined number of transmissions of the data from said given mobile station to said base station.

9. In a diversity transmission system for wireless radio communications between a base station and a plurality of mobile stations, the combination of:

at least two base station antennas at said base station for transmission of data in data packets between said base station and said plurality of mobile stations;

a base station radio transceiver which is selectively connected to said at least two base station antennas;

means for determining which one of said at least two base station antennas received data most successfully during a last data packet transmission from each of said plurality of mobile stations, with this antenna being referred to as a preferred base station antenna with respect to a mobile station it is receiving data from;

a preferred base station antenna storage means, in which is stored a plurality of indicia each one indicative of which base station antenna is determined to be the preferred base station antenna with respect to a different one of said plurality of mobile stations;

means responsive to stored indicia in said preferred base station antenna storage means for selectively connecting said base station radio transceiver to the preferred antenna for controlling the transmission and reception of data between said base station and each of said plurality of mobile stations;

means for changing the preferred base station antenna for a given mobile station if an acknowledgement of reception of data from said given mobile station isn't received within a predetermined time, or if the acknowledgement is received more successfully on a base station antenna other than said preferred antenna;

means for updating the indicia stored in said preferred base station antenna storage means to reflect the change in preferred antenna for said given mobile station;

at least two mobile station antennas at each one of said plurality of mobile stations for transmission of data in data packets between said plurality of mobile stations and said base station;

a mobile station radio transceiver located at each of said plurality of mobile stations, which is selectively connected to said at least two mobile station antennas;

means for determining which one of said at least two mobile station antennas at each of said plurality of mobile stations received data most successfully during a last data packet transmission from said base station, with this mobile station antenna being referred to as a preferred mobile station antenna;

a preferred mobile station antenna storage means in which is stored indicia indicative of which mobile station antenna is determined to be the preferred mobile station antenna;

means at each of said plurality of mobile stations, which is responsive to the stored indicia in said preferred mobile station antenna storage means for selectively connecting said mobile station radio transceiver to the preferred mobile station antenna for controlling the transmission and reception of data between a mobile station and said base station; and means at the stations to select at random one of the antennas at the stations to act as the preferred antenna for any station where there is an absence of stored indicia as to an antenna that received data more successfully.

10. The combination claimed in claim 9, including:

means in said base station for signalling a failure at said base station when said acknowledgement is not received from a given mobile station following a predetermined number of transmissions of the data from said base station to said given mobile station.

11. The combination claimed in claim 10, including:

means in said mobile station for signalling a failure at said given mobile station when an acknowledgement is not received from said base station following a predetermined number of transmissions of the data from said given mobile station to said base station.

* * * * *